United States Patent [19]
Shiakallis

[11] Patent Number: 6,009,518
[45] Date of Patent: Dec. 28, 1999

[54] COMPUTER SYSTEM FOR PROVIDING IMPROVED SECURITY FOR STORED INFORMATION

[76] Inventor: Peter Paul Shiakallis, 1008 Wymers Ct., Chesapeake, Va. 23322

[21] Appl. No.: 08/783,325

[22] Filed: Jan. 15, 1997

[51] Int. Cl.[6] .................................................. G06F 9/445
[52] U.S. Cl. ............................................. 713/1; 713/200
[58] Field of Search ..................... 395/652, 480, 395/700, 500, 375, 575, 442, 186; 364/200; 713/2, 202, 1, 200; 714/42

[56] References Cited

U.S. PATENT DOCUMENTS

| | | | |
|---|---|---|---|
| 5,375,243 | 12/1994 | Parzych et al. | 395/725 |
| 5,410,699 | 4/1995 | Bealkowski et al. | 395/700 |
| 5,574,786 | 11/1996 | Dayan et al. | 380/4 |
| 5,604,890 | 2/1997 | Miller | 395/500 |
| 5,657,470 | 8/1997 | Fisherman et al. | 395/480 |
| 5,694,600 | 12/1997 | Khenson et al. | 395/652 |

*Primary Examiner*—Joseph E. Palys
*Assistant Examiner*—Abu Hossain
*Attorney, Agent, or Firm*—Patton Boggs LLP

[57] ABSTRACT

A computer system and method for storing distinct data types is disclosed. The computer system includes a plurality of data storage devices wherein data of a first type may be stored on a first one of the data storage devices and data of a second type may be stored on at least another one of the data storage devices, wherein at least one of the data types requires controlling access thereto. The invention provides for ensuring the integrity of the data stored on the data storage devices. It also prevents misappropriation of data stored on the devices. The invention includes a switch which selects one of the data storage devices for use with a computer system. Selecting a data storage device activates and places it in an operational mode. The remaining data storage devices are placed into a non-operational mode. Upon selection of one of a data storage device, the computer system implements a complete hardware reset in order to ensure data from one storage device cannot be transferred to another one of a storage device and is not available to users of a another storage device. At least one of the data storage devices will require a password and login code in order to gain access.

10 Claims, 2 Drawing Sheets

COMPUTER SYSTEM FOR PROVIDING IMPROVED SECURITY FOR STORED INFORMATION

BACKGROUND OF THE INVENTION

1. Field of Invention

The invention relates to computer systems for providing improved security for stored data, and more particularly to a computer system including multiple hard drives for storing different types of information.

2. Description of the Related Art

In the area of data collection and storage, the ability to ensure the integrity and security of proprietary and/or classified information can be paramount. From corporate to military and other environments, the ability to separate classified and declassified information and guarantee that only those with proper authority are allowed access to the classified information is a top priority. To this end, vast resources have been spent on various security systems. As a result, systems have been devised which provide for limited access to computer systems, data and/or peripherals used by those systems. For example, U.S. Pat. No. 5,202,997 to Arato discloses an access control model which restricts access to a computer system to authorize users and selectively controls each user's access to associated computer peripherals such as data storage units. To this end, the system, upon start-up requests entry of a valid user identification code. Based upon the user's identification code, the system determines available access to the various peripherals and loads the available information. If the system determines that an unauthorized user is attempting to access information, a microprocessor responds and interrupts the operation of the computer system.

U.S. Pat. No. 4,179,735 to Lodi provides a system wherein access to a specific type of information and/or device peripheral is determined based upon a specific need of a user. The system includes a switch which has a plurality of positions associated with respective working environments and a logic control device which is responsive to the switch position. In response to the switch position, the control device selects a particular group of programs and peripherals for the user to access.

One shortcoming of the known art is that it fails to provide a system for storing a first type of data and a second type of data wherein the two types of data are available to two different types of users. In order to avoid corruption or misappropriation, a user may only gain access to a information type if the user is a member of the group associated with that information type. Further, the known art does not provide a system wherein intermingling of the two types of data is explicitly prevented.

SUMMARY OF THE INVENTION

The invention therefore provides a method and apparatus for improved security of stored information, including securely separating two types of data, limiting the types of users who may obtain access to each data type and ensuring the integrity of the data.

The invention in this respect provides an apparatus which includes a first and a second hard drive, one, for example, for classified information and one, for example, for non-classified information in a single computer case and which further provides for separation and limited access to the two types of information.

The invention further provides a computer system including a switching system for selecting one of two hard drives in order to limit the access to two different types of information stored on the hard drives.

The invention further provides a system which executes a complete hardware reset when a user switches from one hard drive to the other, thereby ensuring total loss of all data left in the memory and forcing a cold reboot of the system.

A more complete understanding of the invention can be obtained by considering the following detailed description in conjunction with the accompanying drawings, wherein like index numerals indicate like parts.

DESCRIPTION OF THE PREFERRED EMBODIMENTS

Figure 1:
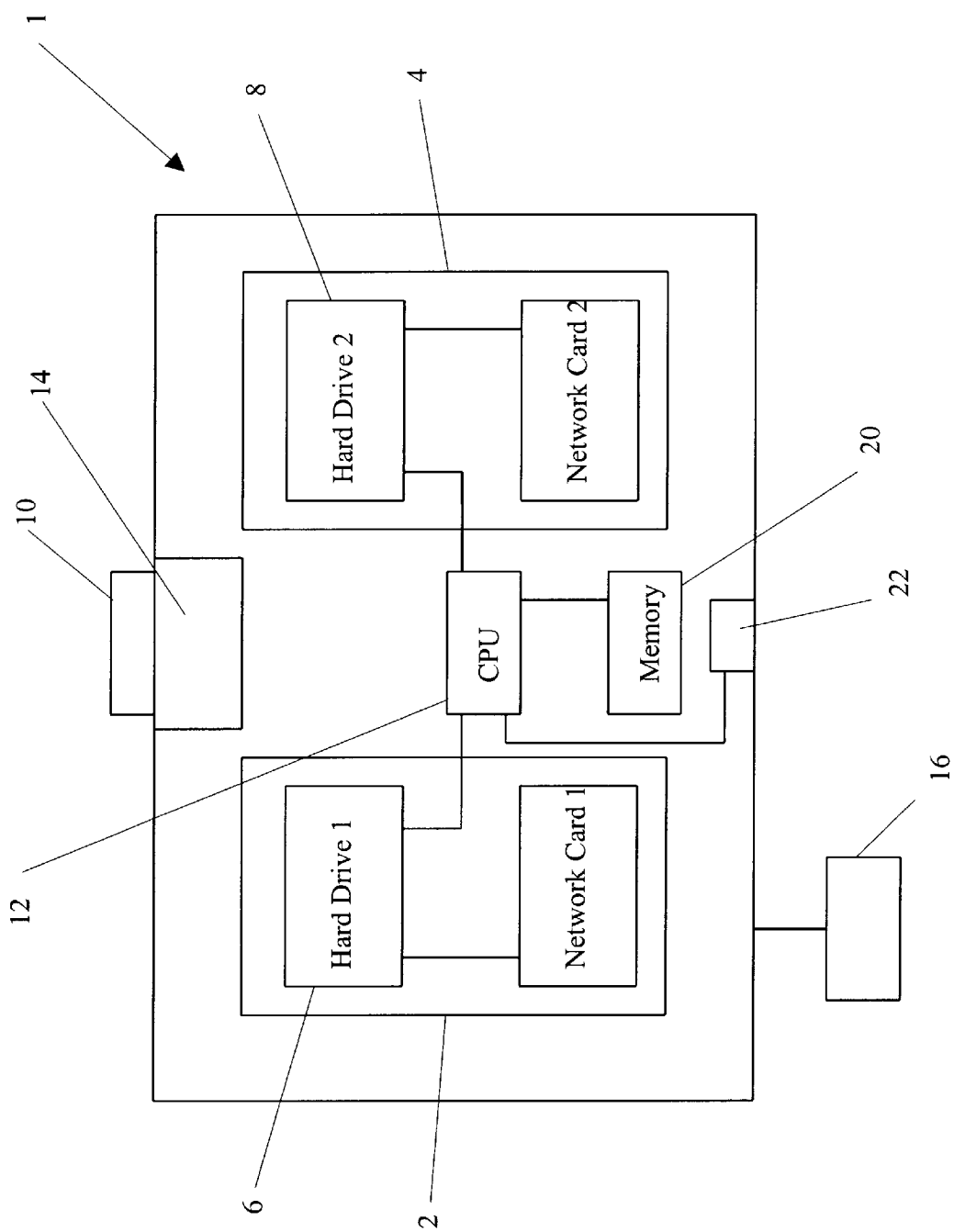
FIG. 1 shows a schematic diagram of the present invention.
Figure 2:
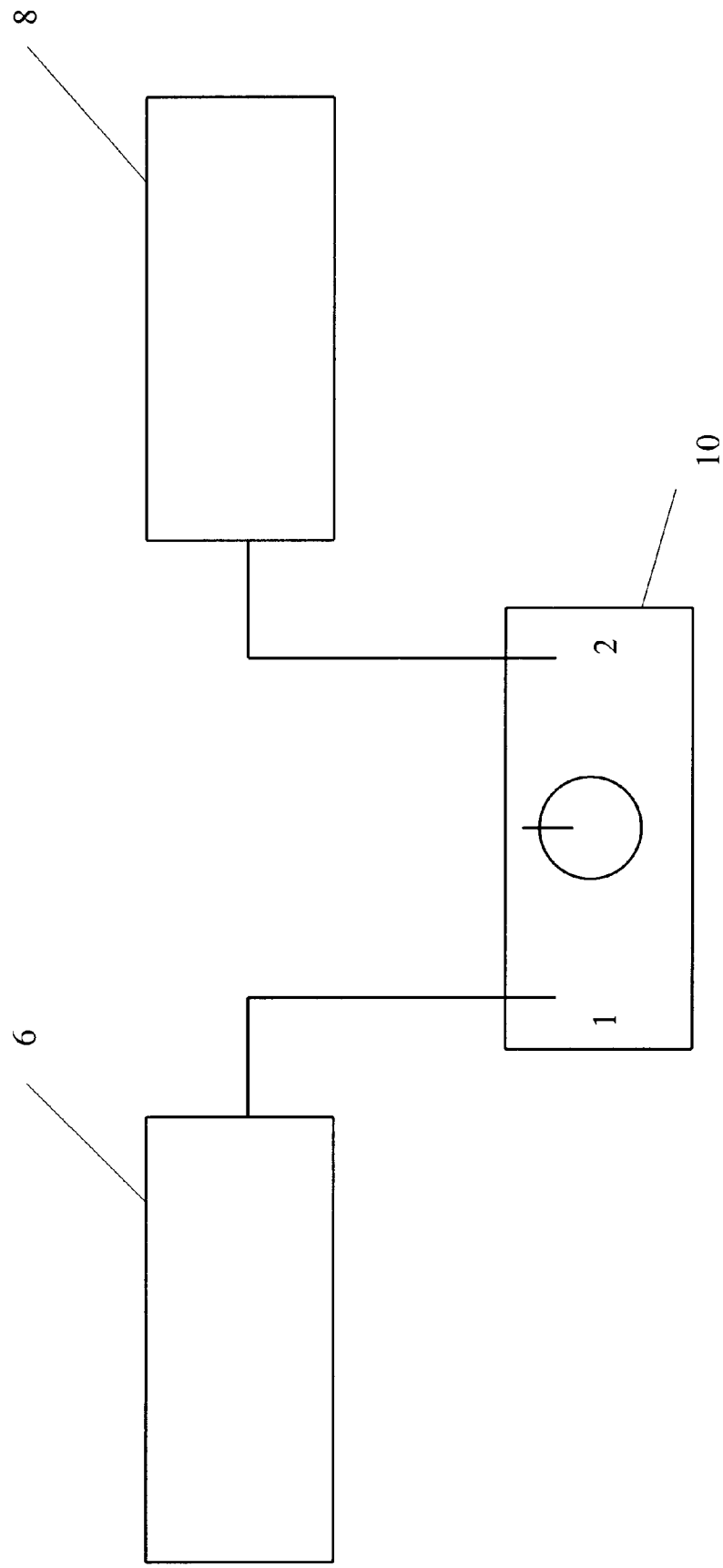
FIG. 2 shows a switch of the present invention of FIG. 1.

The present invention includes a computer system 1 which incorporates various elements to provide for an improved security system. The computer system 1 as illustrated includes two network stations 2 and 4, a first internal hard drive 6 and a second hard drive 8 which may be removable. The network stations 2, 4 and hard drives 6, 8 are configured for incorporation into a single computer case. The system 1 further includes a three-position rotary switch 10 installed on the front of the system. The switch 10 is coupled to a processing unit 12. The processing unit 12, in response to the switch position and other input, selects one of the hard drives. For purposes of this disclosure, the first hard drive 6 will be referred to as a non-classified drive and the second hard drive 8 will be referred to as a classified drive. This is not meant to limit the particular hard drives or the type of information which may be stored on the drives, only provide an example for illustrative purposes. The system 1 also includes a memory element 20 coupled to the processing unit 12. The memory element 20 serves as active memory during application use. The system 1 further includes a power pack unit 14 which is enclosed in a shielded metal case, along with the rotary switch. The power pack 14 is grounded in the main computer frame. The power pack 14 serves as the main power source for operating both the hard drives and the network cards assigned to each hard drive.

In the illustrated invention, only one network and hard drive can be operated at a time. When an authorized user places the switch 10 in a first position, the non-classified mode is activated. While in this mode, only the network card associated with the non-classified hard drive and the non-classified hard drive will be operational and the classified hard drive will be non-operational. In switching from the classified mode to the non-classified mode, the classified hard drive and network card will become operational. When the classified mode is selected, using the switch 10, a login and password must be entered, via an input device 16, for example a keyboard, in order to gain access to the classified hard drive. Whenever a user switches from the non-classified mode to the classified mode, or vice versa, the computer institutes a complete hardware reset of the system, ensuring total loss of all data left in active memory 20, and forcing a cold reboot of the system. This prevents any data transfer from the classified hard drive to the non-classified hard drive and vice versa.

The system may further include a data encryption feature, for example, the products sold under the trademark Watchdog Armor Card and Watchdog PC Data Security, by Fischer International Systems Corp. which becomes operational when the classified mode is selected. As stated above, the classified hard drive can be removable. The removable hard drive can be installed or removed while the computer is operational in the non-classified mode. The removable hard drive includes a locking mechanism built into the drive which prevents unauthorized removal or installation without a special key.

The data encryption feature may be implemented as a hardware/software product which provides maximum protection for the data and programs stored in the classified hard drive. If an unauthorized user attempts to boot the computer from a floppy drive 22, the data encryption feature transfers the boot-up procedure to the hard drive. The data encryption feature protects the classified hard drive from all unauthorized attempts to: change, modify, read, write, format or copy any data stored in the classified hard drive. During operation in the classified mode, all data and files are automatically encrypted onto the classified hard drive. When an authorized user copies or transfers files from the classified drive to a floppy, the user can select encrypted or decrypted mode. If encrypted mode is selected for transferring classified data onto a floppy disk, data on the disk will be unreadable to any other computer not equipped with the compatible encryption system thereby making the data on the floppy disk inaccessible to unauthorized users.

The system may also include an antivirus feature, which may be a hardware/software antivirus maintenance system providing effective protection against any virus intrusion.

The system may also include an internal fax/modem. The fax/modem is operational only in the non-classified mode. The present system provides a simple yet extremely effective system for ensuring complete separation and integrity of the two data types.

In operation, when the switch 10 is placed in a first position, a non-classified mode is activated and the system operates in the following manner: The internal hard drive functions as drive C, the non-classified network card associated with the internal hard drive becomes functional and the floppy drive also becomes functional. The encryption feature will be deactivated. Further, the classified hard drive and network card associated with the classified hard drive will become non-functional. The drive C is accessible by a bootable disk in drive A and the internal fax/modem becomes functional. When the switch 10 is placed in a second position, the classified mode activates. Upon changing the switch from the first to the second position, a complete hardware reset of the system is executed.

When the switch 10 is in the second position and the classified mode is active, the system operates as follows: The removable hard drive functions as drive C. The internal fax/modem becomes non-functional. The encryption feature becomes functional, as well as the antivirus feature. The classified network card associated with the classified hard drive becomes functional and the floppy drive operates in either encrypted or decrypted mode. Therein, data can be transferred onto the floppy disk and will be encrypted or decrypted depending upon a user request. A login and password software activates requiring the user to input proper login and password codes in order to operate the classified hard drive. Only upon receiving a proper login and password code will the processing unit allow the user access to the classified hard drive. The internal non-classified hard drive and the associated non-classified network card becomes non-functional. Further, the drive C is not accessible with a bootable disk from drive A until a proper login and password are entered. At such time as the switch 10 is changed from the second position to the first position, e.g., from classified mode to non-classified mode, the system will also institute a complete hardware reset.

The system security program which provides encryption algorithms for protecting data may be implemented in either hardware or software. A hardware chip, mounted on an expansion card, provides a hardware version of the algorithm for users. The hardware implementation reduces the encryption/decryption time when compared to the software implementation.

The expansion board may also include a secure onboard clock which may only be set by a system administrator. The card synchronizes the PC's clock with the clock of the card so that the time and date are always correct. The on-board clock protects the PC from unauthorized attempts to change and modify the system date and time. It also provides accurate time keeping for the security program audit trail and for all other applications on the PC.

The system may also include a hard disk boot-up feature. If this feature is enabled, the PC cannot be booted from the diskette drive. When the security feature detects any attempt to boot the PC from the disk drive, it transfers the boot-up procedure to the hard disk and activates the security system, wherein a proper login and password are required in order to boot the system.

The system may also include a record system usage feature which tracks usage of the system by various users and generates reports showing selected items of audited information. Further, the system may include a feature which tracks the time spent on projects by various users. A file access permission system may also be included wherein the feature defines the file level activities (execute, read, write, create and delete files) available to individual users while they are working with the information stored on the protected hard drive.

The system may also include the following features. A DOS start-up files permission feature which restricts access to DOS start-up files such as AUTOEXEC.BAT and CONFIG.SYS and prevents users from tampering with the PC's boot up procedure. A record log-in/out date/time feature which tracks excessive PC usage and usage at odd times by recording the date and time each user logs on and off the PC. A program execution record feature which records, in the history file, the name of every program with a .COM or .EXE extension that any user runs. It will record the user ID of the person who runs the program, as well as the date and time. A conceal feature, incorporated into Watchdog, which conceals from the user any areas he/she is not allowed to access and areas the user is not currently logged into. An audit trail feature monitors user activity and effectively maintains data security. The Watchdog feature audits and tracks user activity, DOS directory access, program execution, attempted security violations, and date and time alterations. This also includes a report generator which can be individualized so that reports can be viewed on screen, printed or output to a file.

The Watchdog feature also includes a format protection feature. This prevents the most serious threat to data security: accidentally or maliciously formatting the classified hard drive. This feature is able to protect against and prevent any attempt to format the hard disk by legitimate programs and computer viruses. If an attempt occurs, the feature records a security violation in the audit trail file.

While this invention has been described in conjunction with specific embodiments thereof, it is evident that many alternatives, modifications and variations will be apparent to those skilled in the art. Accordingly, the preferred embodiments of this invention, as set forth herein, are intended to be illustrative, not limiting. Various changes may be made without departing from the spirit and scope of the invention, as defined in the following claims.

What is claimed is:

1. A computer system comprising:

a central processor;

a first data storage device;

a second data storage device; and, switch means having a first position for allowing communication between said first storage device and said central processor and preventing communication between said second storage device and said central processor, a second position for allowing communication between said second storage device and said central processor and preventing communication between said first storage device and said central processor, and a third position intermediate to said first and second positions for performing a computer system reset.

2. A computer system according to claim 1 wherein said switch means comprises manually operable switch means.

3. A computer system according to claim 2 wherein said manually operable switch means comprises a switch for physically breaking the connection between said central processor and said second data storage device when said switch means is in said first position.

4. A computer system according to claim 1 wherein said computer system reset comprises a cold system reboot.

5. A computer system according to claim 4 wherein each of said first and second data storage devices include an operating system.

6. A computer system according to claim 4 further including a network communication device for connecting said system to a network, wherein said communication device is rendered operable when said switch means is said first position and rendered inoperable when said switch means is in said second position.

7. A computer system according to claim 6 wherein said network communication device is a modem.

8. A computer system according to claim 7 wherein said modem is a fax modem.

9. A computer system according to claim 1 wherein said switch means comprises means for preventing said switch means from shifting between said first and second positions without passing through said third position.

10. A computer system according to claim 1 wherein at least one of said first and second data storage devices is a hard disk drive.

* * * * *